US006977374B2

(12) United States Patent
Kawato

(10) Patent No.: US 6,977,374 B2
(45) Date of Patent: Dec. 20, 2005

(54) ION TRAP DEVICE

(75) Inventor: Eizo Kawato, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 11/014,792

(22) Filed: Dec. 20, 2004

(65) Prior Publication Data

US 2005/0133711 A1 Jun. 23, 2005

(30) Foreign Application Priority Data

Dec. 22, 2003 (JP) ............................ 2003-424970

(51) Int. Cl.[7] ......................... H01J 49/00; B01D 59/44
(52) U.S. Cl. ...................................... 250/292; 250/282
(58) Field of Search ................................ 250/292, 282, 250/286

(56) References Cited

U.S. PATENT DOCUMENTS

| | | | | |
|---|---|---|---|---|
| 6,380,666 | B1 | 4/2002 | Kawato | |
| 6,483,244 | B1 | 11/2002 | Kawato et al. | |
| 6,870,159 | B2 * | 3/2005 | Kawato | 250/292 |
| 2004/0132083 | A1 * | 7/2004 | Kawato et al. | 435/6 |
| 2005/0127291 | A1 * | 6/2005 | Kawato | 250/288 |

OTHER PUBLICATIONS

Mark G. Qian et al., American Chemical Society, Analytical Chemistry, vol. 67, No. 7, Apr. 1, 1995, pp. 234A-242A.

* cited by examiner

*Primary Examiner*—Nikita Wells
(74) *Attorney, Agent, or Firm*—Westerman, Hattori, Daniels & Adrian, LLP

(57) ABSTRACT

An ion trap device, which is composed of a ring electrode and a pair of end cap electrodes, according to the present invention includes a capacitor for adjusting a capacitance between the ring electrode and one of the end cap electrodes so that a fluctuation in the voltage of the ring electrode is suppressed when an ion-ejecting voltage is applied to one or both of the pair of end cap electrodes and ions in the ion trap device are ejected. Instead of using a capacitor device, such an object can be realized by modifying a shape of one of the end cap electrodes. The fluctuation in the voltage of the ring electrode can be suppressed when high DC voltages are applied to the end cap electrodes to eject ions from the ion trap device. This enables endowing ejected ions having different mass to charge ratios with the same energy, which prevents the subsequent mass analyzer using the ejected ions from being influenced by the operation parameters, such as the ion-trapping RF voltage, of the ion trap device, and improves the performances, such as the mass resolution and the sensitivity, of the mass analyzer.

10 Claims, 3 Drawing Sheets

ION TRAP DEVICE

The present invention relates to an ion trap device, specifically to an ion trap mass spectrometer, or a time-of-flight mass spectrometer using an ion trap as the ion source.

BACKGROUND OF THE INVENTION

Many ion trap devices currently used are so-called three dimensional quadrupole ion trap devices, which are composed of a ring electrode and a pair of end cap electrodes placed opposite to each other with the ring electrode therebetween, each electrode having an inner surface shaped as a hyperboloid of revolution. Normally, a radio frequency (RF) voltage is applied to the ring electrode to produce a quadrupole electric field in the space (ion trapping space) surrounded by the electrodes for trapping ions in the ion trapping space. The kinetic state of the ions is different depending on their mass to charge ratios, which is used to discriminate or dissociate ions.

Such an ion trap device may be used as a mass spectrometer by itself, or it may be used as an ion source for a subsequent ion analyzer. For example, "A Marriage Made in MS" by M. G Qian and D. M. Lubman, Analytical Chemistry, vol. 67 (1995), No. 7, p. 234A, discloses a multi-stage mass spectrometer in which a three-dimensional quadrupole ion trap is placed before a time-of-flight mass spectrometer (TOFMS). In the multi-stage mass spectrometer, a multi-stage mass analysis is first made in the ion trap, and then the ions are injected into the high-resolution TOFMS to obtain a mass spectrum.

Such a construction of mass spectrometer that an ion trap device is provided before another mass analyzer and ion analyses are successively performed has generated new types of mass analyzers. However, a problem in this structure is that an operation parameter or parameters applied in the ion trap device when ions are transferred from the ion trap to the subsequent mass analyzer may affect the performances of the mass analyzer. For example, the initial kinetic energy of ions transferred from the ion trap to the mass analyzer may change depending on the ion-trapping RF voltage applied to the ring electrode of the ion trap device, and an ion-ejecting high DC voltage or voltages applied to the end cap electrodes may generate a voltage pulse (voltage spike) in the ring electrode, which also changes the initial kinetic energy of the ejected ions.

In a mass spectrometer using a quadrupole ion trap device and a TOFMS, for example, ions trapped in the ion trap keep moving due to the RF voltage applied to the ring electrode. When the ions are to be ejected from the ion trap, appropriate voltages are applied to the end cap electrodes respectively to drive and accelerate the ions toward the subsequent TOFMS. Specifically, as described in U.S. Pat. No. 6,380,666, when ions are ejected, the voltage to the ring electrode is dropped to zero, and a +6 kV DC voltage is applied to the introduction end cap electrode (through which ions enter the ion trap) and −10 kV DC voltage is applied to the extraction end cap electrode. This drives the ions (cations) in the ion trap device toward the extraction end cap electrode, and the ions are ejected through a hole at the center of the extraction end cap electrode to the TOFMS.

In U.S. Pat. No. 6,483,244, a sophisticated method is disclosed for reducing the RF voltage of the ring electrode to zero before ions are ejected to minimize the influence of the ion-trapping RF voltage on the initial kinetic energy of the ions.

SUMMARY OF THE INVENTION

In the Japanese patent application No. 2003-402065, which corresponds to the U.S. patent application of the same applicant filed on Nov. 30, 2004, unofficial Ser. No. 10/998,567, a method is proposed to shorten the time needed to drop the RF voltage to zero. Using the method, the voltage to the ring electrode when the ions are ejected can be made zero irrespective of the amplitude of the RF voltage before the ions are ejected, and the initial kinetic energy of the ejected ions is not affected by the RF voltage. Precisely saying, all the voltages to the ring electrode and to the two end cap electrodes are momentarily made zero before the ionaccelerating DC voltages are applied to the end cap electrodes and the ions are ejected. This prevents influences of the operation parameters of the ion trap device on the initial kinetic energy of the ejected ions.

On the other hand, when high DC voltages are applied to the end cap electrodes, a spike pulse of the voltage arises in the ring electrode, which changes the initial kinetic energy of ions ejected to the TOFMS. This causes a deviation of the flight time of an ion from the square root of the mass to charge ratio of the ion, which complicates the calculation of the flight time and make it difficult to precisely calibrate the mass scale of the time-of-flight spectrum.

Using the above described methods, it is possible to make the voltages of the electrodes to zero just before ions are ejected. But the problem of the fluctuation in the voltage of the ring electrode when ion-ejecting voltages are applied to the end cap electrodes is not yet solved.

Normal quadrupole ion trap device is composed of a ring electrode and a pair of end cap electrodes placed at both ends of the ring electrode. The end cap electrodes are placed symmetrically because that is convenient to apply voltages of the same amplitude, irrespective of the polarities, to the end cap electrodes when ions in the ion trap are operated in various ways including selection of ions, and dissociation of the ions to perform an MS/MS mass analysis.

By making the inner surface of the electrodes conform to an equipotential surface of the quadrupole electric field, a theoretically ideal quadrupole electric field can be generated in the ion trapping space. However, since manufacturing error is different for different size and shape of the electrode surface, it is inevitable that more asymmetry is introduced to the quadrupole electric field. This configuration of inner surfaces also causes disorders of the quadrupole electric field at edges of the electrodes, and amount of the multi-pole electric field overlapping to the ion-trapping quadrupole electric field may develop. This leads to deteriorated performances of ion separation and ion dissociation.

If the two end cap electrodes are formed symmetrical to each other with respect to the ring electrode, the capacitances inherently existing between the ring electrode and each of the end cap electrodes are the same. In this case, when voltages of different values, such as +6 kV and −10 kV, are applied to the respective end cap electrodes, different amounts of electric charge are stored in the inherent capacitances, whereby the voltage of the ring electrode deviates from 0V. Though the voltage can be damped to zero using the conventional methods described above, it takes microseconds until the voltage is completely damped, which allows generating voltage spike in the ring electrode.

In summary, while ions are accelerated and ejected from the ion trap, the voltage of the ring electrode changes, and the ion-accelerating electric field generated in the ion trapping space changes with respect to time. Ions having smaller mass to charge ratios are accelerated faster and ejected from the ion trap earlier, but ions having larger mass to charge ratios are accelerated slower and it takes a longer time until they are ejected from the ion trap, where, in the meantime, the electric field in the ion trap largely changes. This means that ions of different mass to charge ratios are accelerated by different accelerating electric fields, and their initial kinetic energies are different when they are ejected. Thus the spike pulse of the voltage arising in the ring electrode affects the initial kinetic energy of ejected ions, whereby their flight time cannot be calculated according to the theory; and the flight time becomes a complicated function of the mass to charge ratio of the ion rather than being proportional to the square root of the mass to charge ratio. This prevents precise calibration of the mass scale of the time-of-flight spectrum.

On the other hand, the voltage application to the end cap electrodes is completed in tens of nanoseconds, and, in such a short time, ions in the ion trap hardly change their position. If, therefore, it is possible to fix the voltage of the ring electrode to zero, all the ions having different mass to charge ratios gain the same acceleration energy, and their flight time is proportional to the square root of their mass to charge ratio, which accords to the theory. Thus, in order to precisely calibrate the mass scale of the time-of-flight spectrum, it is necessary to prevent the spike pulse of the voltage from arising in the ring electrode when ions are ejected from the ion trap, even in the case where voltages of different magnitude are applied to the end cap electrodes.

The present invention addresses the above problem, and provides an ion trap device including:

a ring electrode and a pair of end cap electrodes placed opposite to each other with the ring electrode therebetween; and capacitance adjusting means for adjusting a capacitance between the ring electrode and one of the end cap electrodes or capacitances between the ring electrode and the respective end cap electrodes so that a fluctuation in the voltage of the ring electrode is suppressed when an ion-ejecting voltage is applied to one or both of the pair of end cap electrodes and ions in the ion trap device are ejected.

In the ion trap device disclosed above, the capacitance adjusting means may be a capacitor connected between the ring electrode and one of the end cap electrodes, or capacitors connected between the ring electrode and both of the end cap electrodes respectively.

Otherwise, the capacitance adjusting means may be realized by modifying a shape of one of the end cap electrodes, or shapes of both of the end cap electrodes.

It is preferable in the above ion trap device that the the capacitances between the ring electrode and the respective end cap electrodes are adjusted to be in inverse proportion to a voltage applied to the end cap electrodes.

In the ion trap device according to the present invention, the fluctuation in the voltage of the ring electrode can be suppressed when high DC voltages are applied to the end cap electrodes to eject ions from the ion trap device. This enables endowing ejected ions having different mass to charge ratios with the same energy, which prevents the subsequent mass analyzer using the ejected ions from being influenced by the operation parameters, such as the ion-trapping RF voltage, of the ion trap device, and improves the performances, such as the mass resolution and the sensitivity, of the mass analyzer.

DETAILED DESCRIPTION OF A PREFERRED EMBODIMENT

Figure 1:
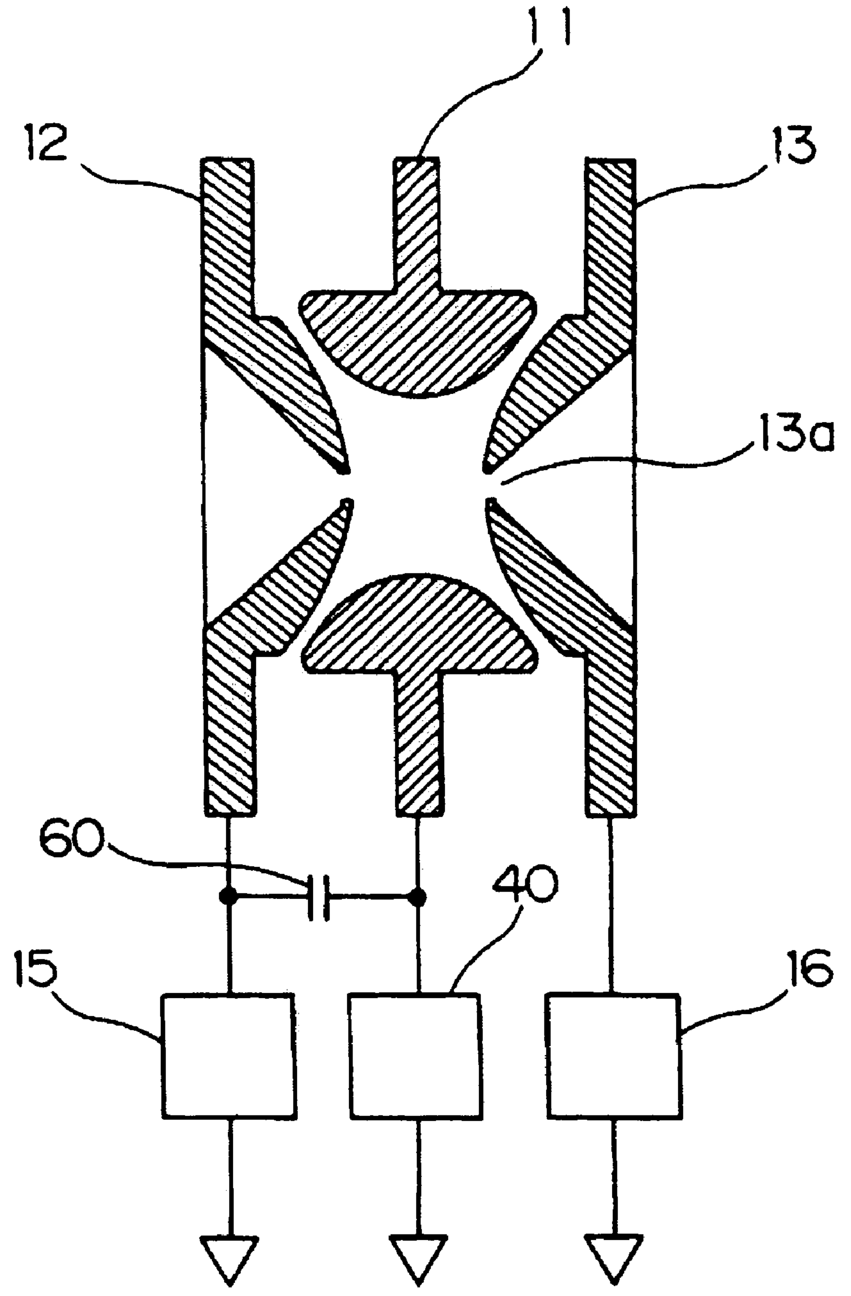
FIG. 1 illustrates the main part of an ion trap device for explaining the working principle of the present invention.

When ions are trapped in the ion trap device of FIG. 1, an RF voltage is applied to the ring electrode 11, and the voltage of the two end cap electrodes 12, 13 are normally kept close to be grounded (0V). When ions are to be ejected, the RF voltage to the ring electrode 11 is stopped and the ring electrode 11 is grounded. And appropriate DC voltages, +6 kV and −10 kV, for example, are applied to the end cap electrodes 12, 13 respectively, whereby the ions in the ion trap are accelerated and ejected through the hole 13*a* at the center of the extraction end cap electrode. Supposing that the inherent capacitances between the ring electrode 11 and the end cap electrodes 12, 13 are both 10 pF, the amounts of electric charge induced in the ends of the ring electrode 11 is 60 nC and −100 nC respectively, whereby the electric charge of −40 nC is induced in the ring electrode 11 as a whole. If the total capacitance of the ring electrode 11 is 100 pF, the voltage of the ring electrode 11, which was zero before the voltage to the end cap electrodes are applied, becomes about −400V. By using the method described in U.S. Pat. No. 6,483,244 and the above described pending U.S. Patent Application by the same applicant filed on Nov. 30, 2004, unofficial Ser. No. 10/998,567, the voltage induced to the ring electrode 11 can be damped in microseconds. But the damping time is not negligibly short compared to the time needed to eject ions.

According to the present invention, a capacitor 60 is provided between the ring electrode 11 and the introduction end cap electrode 12 to which the smaller voltage, +6 kV in the above case, is applied. Owing to the capacitor 60, the electric charge induced to the capacitance between the ring electrode 11 and the introduction end cap electrode 12 is increased by +40 nC, whereby no effective electric charge is induced to the ring electrode 11 as a whole. Thus the voltage of the ring electrode 11 is kept at zero even when the high DC voltages are applied to the end cap electrodes 12, 13, and ions having different mass to charge ratios are ejected from the ion trap with equal initial kinetic energy. This allows ion ejection without deteriorating the performances of the TOFMS.

It is appropriate to set the capacitance of the capacitor 60 connected between the introduction end cap electrode to which +6 kV is applied and the ring electrode 11 at 6.67 pF in order to induce the electric charge of +40 nC. Thus the capacitances between the ring electrode 11 and the two end cap electrodes 12, 13 ought to be 16.67 pF and 10 pF respectively, which are in inverse proportion to the voltages applied to respective end cap electrodes.

Since the exact value of the capacitance of the capacitor connected between the end cap electrode and the ring electrode actually depends on the capacitances between the electrodes and the value of the high DC voltage applied to the end cap electrodes when ions are ejected, the value should be appropriately determined according to respective devices through experiments, for example.

Figure 2:
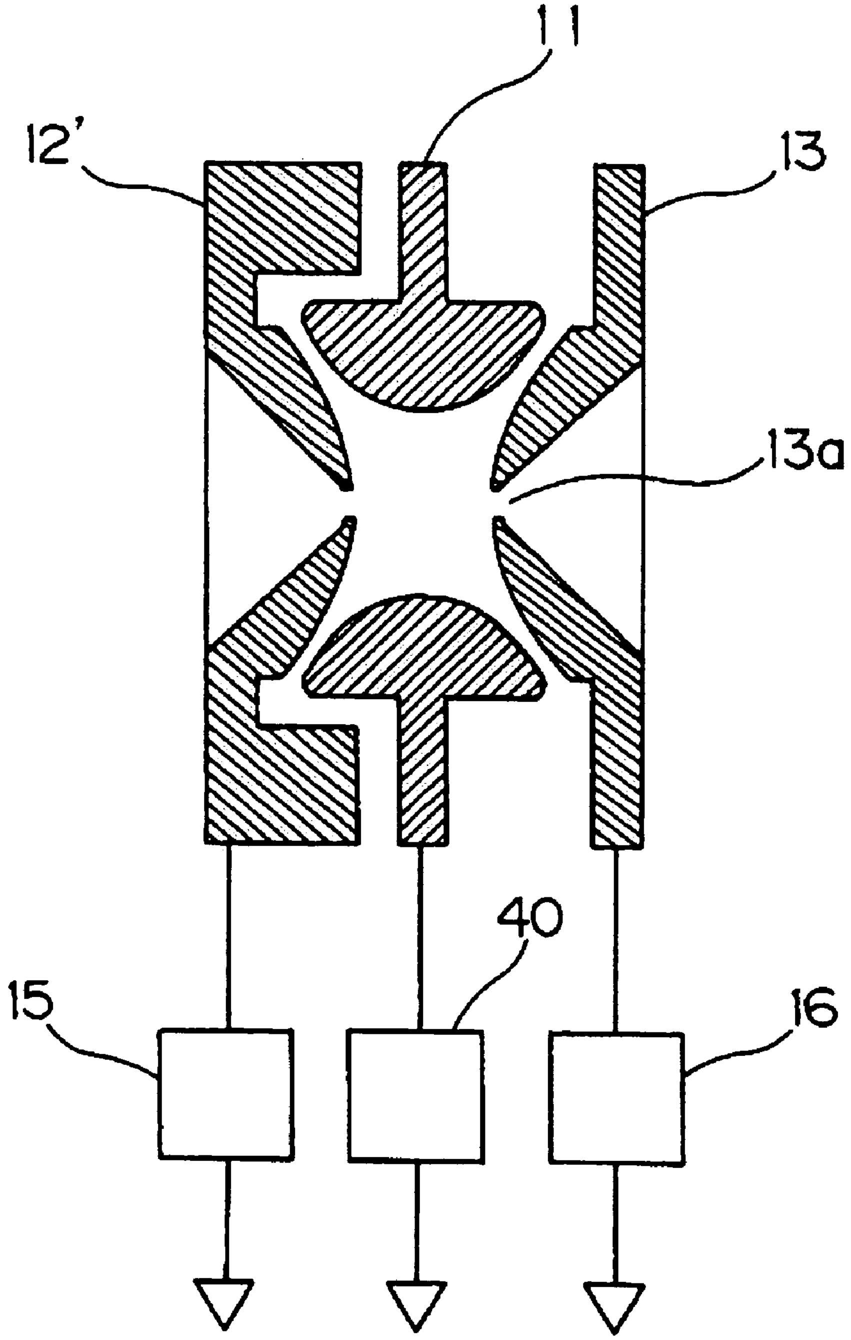
FIG. 2 illustrates the main part of a modified ion trap device according to the present invention.

In the example of FIG. 1, a capacitor 60 is used to control the amount of electric charge induced in the ring electrode 11. Instead of that, it is possible to modify the shape of an end cap electrode 12', as shown in FIG. 2, to change the capacitance between the end cap electrode 12' and the ring electrode 11. In this case, it is important for the modified shape not to affect the electric field within the ion trapping space. This also enables controlling the amount of electric charge induced in the ring electrode 11. It is of course possible to change the shapes of the both of the two end cap electrodes to appropriately adjust the capacitances between the electrodes, and thus the amount of electric charge induced in the ring electrode 11.

The present invention is more specifically described with reference to the example of FIG. 3, which illustrates the main part of a mass analyzer using an ion trap device 10 according to the present invention as an ion source. The ion trap device 10 is composed of a ring electrode 31 and a pair of end cap electrodes 32, 33. An RF voltage generated by an RF driver 41 is applied to the ring electrode 31, whereby a quadrupole electric field is produced in an ion trapping space 14 surrounded by the electrodes 31, 32 and 33. A pair of end cap voltage generators 15, 16 are connected to the respective end cap electrodes 32, 33, and appropriate end cap voltages are applied to the end cap electrodes 32, 33 at necessary steps in a mass analysis.

For example, when ions generated in a MALDI (Matrix-Assisted Laser Desorption/Ionization) ion source 20 are to be introduced in the ion trap device 10, voltages to decrease the kinetic energy of (or decelerate) the entering ions are applied to the two end cap electrodes 32, 33, or to one of them. When the mass to charge ratios of the ions trapped in the ion trap device 10 are to be analyzed in a TOFMS 30 placed after the ion trap device 10, appropriate voltages are applied to the end cap electrodes 32, 33 to accelerate and eject the ions toward the TOFMS. Further, when ions are to be selected or dissociated in the ion trap device 10, appropriate voltages are applied to the end cap electrodes 32, 33 to form an electric field in the ion trapping space 14 for such selection or dissociation superimposing on the ion-trapping quadrupole electric field produced by the RF voltage.

A coil 42 is connected to the ring electrode 31 as a part of a ring voltage generator 40 for applying the RF voltage to the ring electrode 31, and the coil 42 and the capacitance between the ring electrode 31 and the end cap electrodes 32, 33 substantially constitute an LC resonant circuit. A capacitor 60 is provided between an end cap electrode 32 and the ring electrode 31, which is included in the capacitance of the LC resonant circuit. Precisely saying, the capacitance constituting the LC resonant circuit includes, besides those inherent between the electrodes 31–33, the capacitances associated with an RF voltage monitoring circuit (not shown), a tuning circuit 43, switches 46, 47, wires connecting the elements, etc., and the overall capacitance and the inductance of the coil 42 determine the resonance frequency of the LC resonant circuit.

There are various methods of driving the LC resonant circuit, including one using a transformer. In the present embodiment, an end of the coil 42 is directly driven by the RF driver 41. Since the frequency of the RF driver 41 is fixed at 500 kHz, the tuning circuit 43 is operated to adjust the resonance frequency of the LC resonant circuit to 500 kHz, so that a resonated and amplified voltage is obtained. In the present embodiment, a vacuum variable capacitor is used for the tuning circuit 43, and its capacitance is adjusted to obtain resonance. Alternatively, the inductance of the coil 42 can be adjusted, moving a ferrite core, for example, to obtain resonance.

Figure 3:
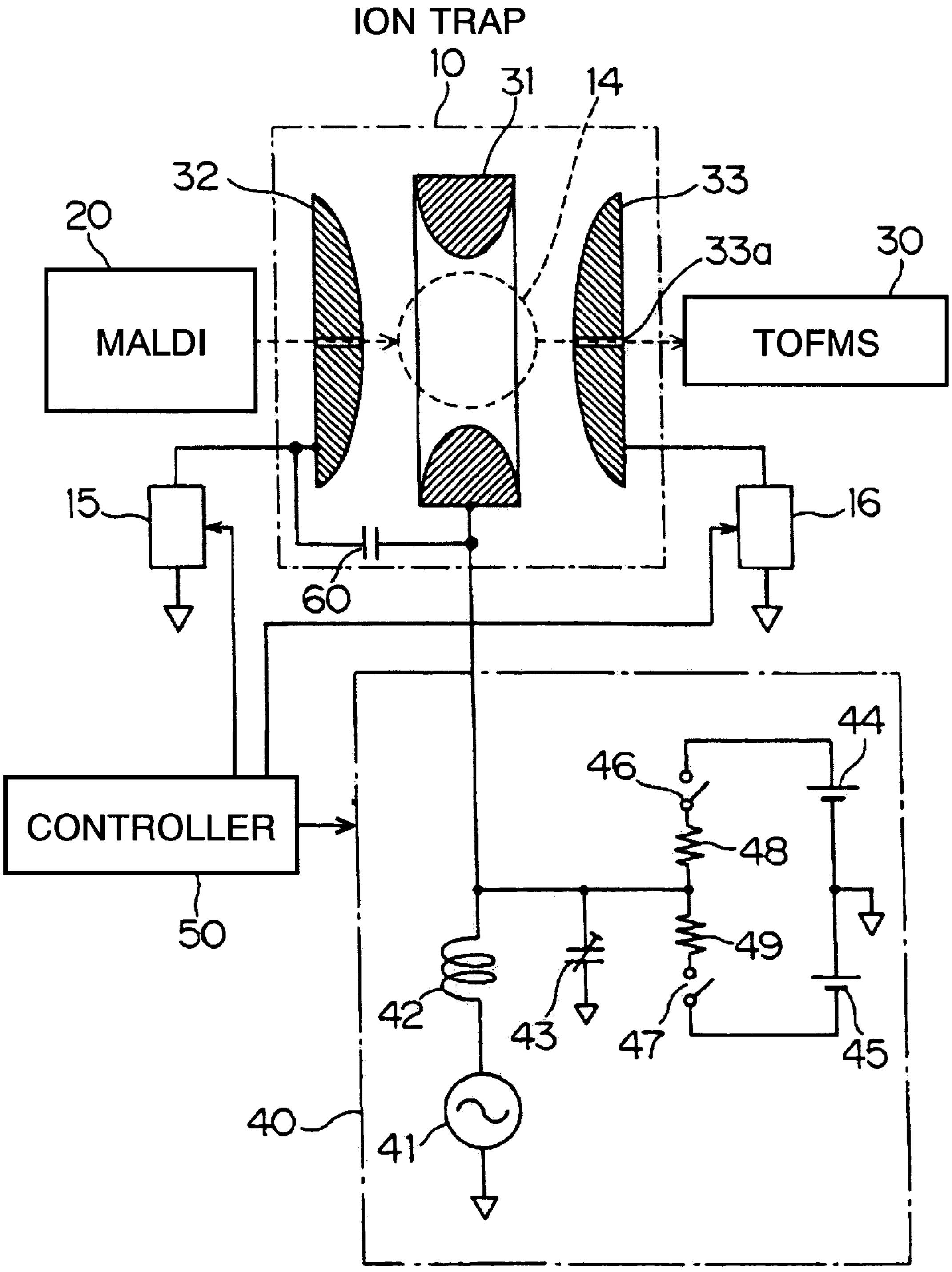
FIG. 3 is a schematic diagram of a mass spectrometer using an ion trap according to the present invention as an ion source.

To the ring electrode 31 are further connected high voltage DC sources 44, 45 via respective switches 46, 47 and resistances 48, 49 as shown in FIG. 3. These are used to quickly start the RF voltage when ions are injected into the ion trap device 10, and to stop it before ions are ejected from the ion trap device 10. When the application of the RF voltage drive is stopped, however, the RF voltage in the ring electrode 31 cannot stop instantaneously but decreases exponentially with a certain time constant.

When a sample is analyzed, ions are introduced in the ion trapping space 14, and various operations are made on the ions such as selection, excitation or dissociation. At this time, an RF voltage of an appropriate amplitude is applied to the ring electrode 11 depending on the range of mass to charge ratio of the object ions. Then, in order to eject ions from the ion trapping space 14, the switches 46, 47 are simultaneously turned ON and the output of the RF driver 41 is turned zero. As a result of these operations, the ring electrode 31 is connected to the high voltage DC sources 44, 45 via the resistances 48, 49, and the RF voltage that had been applied to the ring electrode 31 before the switches 46, 47 are turned ON decreases exponentially. When the RF voltage is adequately decreased, ion-ejecting high voltages are applied from the end cap voltage generators 15, 16 to the end cap electrodes 32, 33 respectively, so that ions are accelerated and ejected through the hole **33*a* of the end cap electrode 33 to the TOFMS 30. In the present embodiment, the ion-ejecting high voltages are applied to the end cap electrodes 32, 33 about three microseconds after the switches 46, 47 are turned ON. The controller 50 controls the operations of the ring voltage generator 40, end cap voltage generators 15, 16** and other parts of the mass spectrometer in order to perform a mass analysis of a sample.

In the present embodiment, the capacitance of the capacitor 60 is set at 7.5 pF, and the DC voltages to the end cap electrodes 32, 33 for ejecting ions are set at +5.54 kV and −10 kV respectively. Owing to this configuration, the peak magnitude of the spike pulse of the voltage arising in the ring electrode 31 can be suppressed to less than 5V when high DC voltages are applied to the end cap electrodes 32, 33 to eject ions.

Since the voltage fluctuation in the ring electrode 31 is thus greatly reduced, influences to the kinetic energy of ejected ions, especially of ions of smaller mass to charge ratios, are minimized, and the performances of the TOFMS, such as the mass resolution and the sensitivity, are improved.

Although only an exemplary embodiment of the present invention has been described in detail above, those skilled in the art will readily appreciated that many modifications are possible in the exemplary embodiment without materially departing from the novel teachings and advantages of this invention. Accordingly, all such modifications are intended to be included within the scope of this invention.

In the above embodiment, for example, a capacitor 60 is used between the ring electrode 31 and an end cap electrode 32. It is possible to provide capacitors between the ring electrode and both of the end cap electrodes 32, 33 respectively, and adjust the values of the capacitors appropriately to obtain the same result as above.

Instead of using a separate capacitor device or devices, the shape of the end cap electrode 32 may be modified to change the capacitance between the end cap electrode 32 and the ring electrode 31, as shown in FIG. 2. This can also suppress the voltage fluctuation in the ring electrode 31 when ions are ejected. In this case also, shapes of both of the end cap electrodes can be modified to obtain the same result.

It is of course possible to use the methods of adding the capacitor 60 and modifying the shape of the end cap electrode 32 simultaneously.

In the preceding embodiments and drawings, a point of the circuit is grounded for the simplicity of explanation. It should be noted that the grounded point may be any part of the circuit, or the circuit may not be grounded at all, if the quadrupole electric field can be generated in the ion trap device 10, the RF voltage can be damped when the switches 46, 47 are operated, and the ion-ejecting electric field can be generated between the end cap electrodes.

Further, though the RF driver 41 is directly connected to the coil 42 in the above embodiment, the coil can be driven by a transformer coupling or any other means.

What is claimed is:

1. An ion trap device comprising:

a ring electrode and a pair of end cap electrodes placed opposite to each other with the ring electrode therebetween; and capacitance adjusting means for adjusting a capacitance between the ring electrode and one of the end cap electrodes, or capacitances between the ring electrode and the respective end cap electrodes so that a fluctuation in the voltage of the ring electrode is suppressed when an ion-ejecting voltage is applied to one or both of the pair of end cap electrodes and ions in the ion trap device are ejected.

2. The ion trap device according to claim 1, wherein the capacitance adjusting means is a capacitor connected between the ring electrode and one of the end cap electrodes, or capacitors connected between the ring electrode and both of the end cap electrodes respectively.

3. The ion trap device according to claim 1, wherein the capacitance adjusting means is realized by modifying a shape of one of the end cap electrodes, or shapes of both of the end cap electrodes.

4. The ion trap device according to claim 1, wherein the capacitances between the ring electrode and the end cap electrodes are adjusted to be in inverse proportion to a voltage applied to said end cap electrodes.

5. The ion trap device according to claim 1, wherein the ions are ejected to a time-of-flight mass analyzer.

6. A method of operating an ion trap device composed substantially of a ring electrode and a pair of end cap electrodes placed opposite to each other with the ring electrode therebetween, the method comprising a step of adjusting a capacitance between the ring electrode and one of the end cap electrodes or capacitances between the ring electrode and the respective end cap electrodes so that a fluctuation in the voltage of the ring electrode is suppressed when an ion-ejecting voltage is applied to one or both of the pair of end cap electrodes and ions in the ion trap device are ejected.

7. The ion trap device operating method according to claim 6, wherein the capacitance is adjusted by using a capacitor connected between the ring electrode and one of the end cap electrodes, or capacitors connected between the ring electrode and both of the end cap electrodes respectively.

8. The ion trap device operating method according to claim 6, wherein the capacitance is adjusted by modifying a shape of one of the end cap electrodes, or shapes of both of the end cap electrodes.

9. The ion trap device operating method according to claim 6, wherein the capacitances between the ring electrode and the end cap electrodes are adjusted to be in inverse proportion to a voltage applied to said end cap electrodes.

10. The ion trap device operating method according to claim 6, wherein the ions are ejected to a time-of-flight mass analyzer.

* * * * *